United States Patent
Young et al.

(10) Patent No.: US 9,516,616 B2
(45) Date of Patent: Dec. 6, 2016

(54) METHOD AND APPARATUS FOR ESTIMATING FREQUENCY ERRORS

(71) Applicant: Neul Ltd., Histon (GB)

(72) Inventors: Robert Young, Histon (GB); Brian Gaffney, Histon (GB)

(73) Assignee: Neul Ltd., Histon (GB)

( * ) Notice: Subject to any disclaimer, the term of this patent is extended or adjusted under 35 U.S.C. 154(b) by 0 days.

(21) Appl. No.: 14/400,404

(22) PCT Filed: May 10, 2013

(86) PCT No.: PCT/EP2013/059738
§ 371 (c)(1),
(2) Date: Nov. 11, 2014

(87) PCT Pub. No.: WO2013/167740
PCT Pub. Date: Nov. 14, 2013

(65) Prior Publication Data
US 2015/0139219 A1    May 21, 2015

(30) Foreign Application Priority Data
May 11, 2012    (GB) .................................. 1208245.9

(51) Int. Cl.
*H04W 56/00* (2009.01)
*H04L 27/00* (2006.01)
*H04L 27/26* (2006.01)

(52) U.S. Cl.
CPC ...... *H04W 56/0035* (2013.01); *H04L 27/0014* (2013.01); *H04L 27/266* (2013.01);
(Continued)

(58) Field of Classification Search
CPC ..................... H04W 56/0035; H04L 27/0014; H04L 27/2655; H04L 27/2657; H04L 27/2659; H04L 27/266; H04L 2027/0046; H04L 2027/0065; H04L 2027/0095
USPC ........................................................ 375/350
See application file for complete search history.

(56) References Cited

U.S. PATENT DOCUMENTS 7,330,523 B2 *  2/2008  Young ................... H04L 27/152
                                                        375/224
7,333,792 B2 *  2/2008  Hamamoto ......... H04L 27/2657
                                                        375/324

(Continued)

FOREIGN PATENT DOCUMENTS

EP         1282258 A1    2/2003
EP         1776796 A1    4/2007

(Continued)

OTHER PUBLICATIONS

Kuo et al, "Generalized frequency offset estimation in OFDM systems using periodic training symbol" Communications, 2005. ICC 2005. 2005 IEEE International Conference on Seoul, Korea May 16-20, 2005, Piscataway, NJ, USA, IEEE LNKD-DOI:10.1109/ICC.2005.1494445, vol. 1, May 16, 2005 (2005-05-126), pp. 715-719, XP010825385 ISBN: 978-0-7803-8938-0.*

*Primary Examiner* — Luat Phung
*Assistant Examiner* — Thomas R Cairns
(74) *Attorney, Agent, or Firm* — Slater Matsil, LLP

(57) ABSTRACT

A frequency error embodied in a series of values is determined by processing each of two or more selected values with another value in the series, each other value being spaced from its respective selected value by a first spacing, to generate processed values that all comprise substantially the same phase component; combining the processed values to generate a combined value that comprises substantially the same phase component as the processed values; repeating the processing and combining with the same selected values but a second spacing, different from the first spacing, to generate a combined value comprising a different phase component from the combined value generated using the first spacing, reflecting the frequency error; and determining the frequency error in dependence on the combined values generated using the first and second spacings.

15 Claims, 7 Drawing Sheets

(52) U.S. Cl.
CPC ....... *H04L27/2655* (2013.01); *H04L 27/2657* (2013.01); *H04L 27/2659* (2013.01); *H04L 2027/0046* (2013.01); *H04L 2027/0065* (2013.01); *H04L 2027/0095* (2013.01)

(56) References Cited

U.S. PATENT DOCUMENTS

| | | | | |
|---|---|---|---|---|
| 2006/0274641 | A1* | 12/2006 | Grieco | H04L 27/2614 370/210 |
| 2007/0076786 | A1* | 4/2007 | Shanmugam | G01S 19/24 375/148 |
| 2008/0186841 | A1 | 8/2008 | Fung et al. | |
| 2008/0279172 | A1* | 11/2008 | Suemitsu | H04L 27/0014 370/347 |
| 2009/0274233 | A1* | 11/2009 | Niu | H04L 27/0014 375/267 |

FOREIGN PATENT DOCUMENTS

| | | |
|---|---|---|
| WO | 2005004379 A1 | 1/2005 |
| WO | 2011026524 A1 | 3/2011 |

* cited by examiner

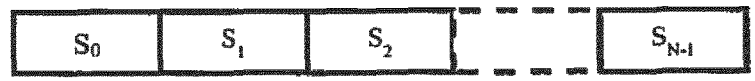
Example preamble
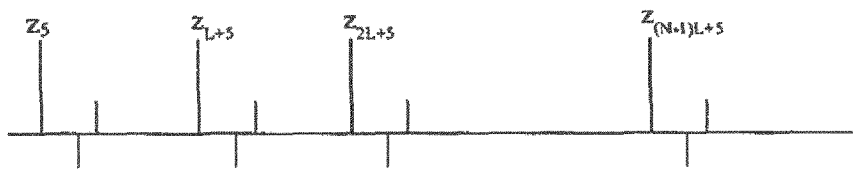
Example cross correlation output with zero noise
Figure 1 --prior art--
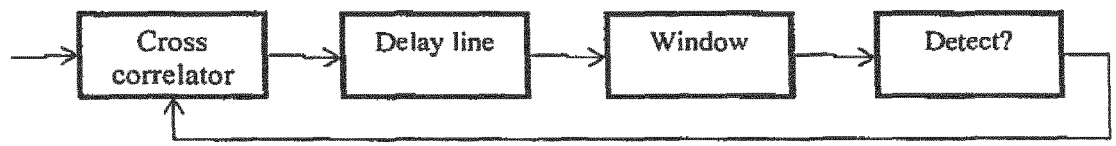
Figure 2

METHOD AND APPARATUS FOR ESTIMATING FREQUENCY ERRORS

This patent application is a national phase filing under section 371 of PCT/EP2013/059738, filed May 10, 2013, which claims the priority of British patent application 1208245.9, filed May 11, 2012, each of which is incorporated herein by reference in its entirety.

TECHNICAL FIELD

The invention relates to a method for determining a frequency error, which may be a frequency error between a transmitter and receiver in a wireless communication network.

BACKGROUND

A communication may be arranged in the form of a frame comprising a preamble for synchronisation followed by a data payload. The preamble may comprise multiple repetitions of a synchronisation word that is known to the receiver. To detect the start of the frame, the receiver has to detect this repeated pattern in the presence of noise. The receiver typically does not have prior knowledge of the frequency error between it and the transmitter or of the channel impulse response. The benefits of accurate and fast detection of the start of the frame include allowing the system to reduce the length of the preamble required in each frame, allowing the receiver to dedicate more of the received preamble data to frequency or channel estimation and improving the overall detection rate.

The goal of the preamble detection is to detect when a frame is present, i.e. when a channel exists at the output of the correlator. In one method, the received samples are initially correlated with the synchronisation word. An example output of this stage is shown in FIG. 1, where z is the output of the correlator. Some lags will generate peaks in the correlator output. In FIG. 1, a lag of 5 samples generates the highest peaks. The synchronisation word is L samples long, and therefore the peak repeats itself every L samples. Each of these peaks represents an estimate of the channel impulse response.

FIG. 1 illustrates an example of a correlator output when there is no frequency error between the transmitter and the receiver and the channel does not change significantly over the length of the preamble. Consequently the peaks repeat themselves at a regular spacing of L samples. In practical systems there may be a frequency error between transmitter and receiver, which is unknown to the receiver. In this case the channel impulse response is still repeated, but with an unknown phase shift across the synchronisation words.

Without an accurate estimate of the frequency offset, it is very difficult for the receiver to demodulate the transmitted data correctly. The accumulating rotation in the symbol constellation can result in significant errors. It is therefore important to estimate the frequency offset accurately. Typically, this is achieved by examining the received preamble and finding the rate of change of the complex angle between the symbols in that preamble.

Existing schemes for estimating the frequency offset either limit the frequency capture range, are computationally intensive or do not perform well at low signal to noise ratios (SNR). Simpler estimators in particular tend to suffer at low SNR due to noise affecting the angle estimation. Noise at the input to the arctangent function (which is an important operation in the frequency offset estimation) causes the output of the arctangent function to be almost uniformly distributed between +/−π at low SNR (at high SNR it is approximately Gaussian distributed about the expected angle of the input signal). This means it can be very difficult to estimate the offset accurately at low SNR.

Therefore, an improved method for estimating a frequency offset is required.

SUMMARY

According to a first embodiment of the invention, there is provided a method for determining a frequency error embodied in a series of values, each comprising a phase component, by a change in those phase components across the series, the method comprising processing each of two or more selected values with another value in the series, each other value being spaced from its respective selected value by a first spacing, to generate processed values that all comprise substantially the same phase component, combining the processed values to generate a combined value that comprises substantially the same phase component as the processed values, repeating the processing and combining with the same selected values but a second spacing, different from the first spacing, to generate a combined value comprising a different phase component from the combined value generated using the first spacing, reflecting the frequency error, and determining the frequency error in dependence on the combined values generated using the first and second spacings.

Each value in the series of values may represent a comparison between a received signal and a known sequence.

The series of values may embody a frequency error between a transmitter and a receiver, and the method may comprise generating the series of values by comparing signal received from the transmitter by the receiver with a known sequence.

The method may comprise comparing the received signal with the known sequence by selecting a section of the received signal, performing a correlation operation between the selected section and the known sequence and designating the result of that correlation as a value in the series.

The change in the phase components across the series may reflect the received signal becoming increasingly rotated with respect to the known sequence as a consequence of said frequency error.

The phase components may change across the series substantially linearly with time.

The method may comprise processing each of the selected values with their respective other value by performing a correlation operation between the two values.

The method may comprise coherently combining the processed values.

Each of the series of values comprises a wanted component and noise, and the method may comprise processing the series of values and combining the processed values such that the wanted components are coherently combined and the noise is incoherently combined, whereby the combined values so generated form a second series of values that embodies the frequency error but in which the ratio of wanted component to noise has been improved compared with the series of values.

Determining the frequency error may comprise determining difference between phase component comprised in the combined value generated using the first spacing and the phase component comprised in the combined value generated using the second spacing.

Determining the difference in phase component may comprise multiplying one of the combined values generated using the first and second spacings with the complex conjugate of the other of the combined values generated using the first and second spacings.

The method may comprise repeating the processing and combining with the same selected values but a third spacing, different from the first and second spacings.

The method may comprise determining a difference(s) between the phase component comprised in the combined value generated using the third spacing and the phase component comprised in the combined value generated using the second spacing and/or the phase component comprised in the combined value generated using the first spacing.

The method may comprise determining a linear relationship linking the phase changes across the combined values generated using the first, second and third spacings.

Determining the linear relationship may comprise treating the phase changes across the combined values as being representative of a straight line and determining slope of that straight line.

The method may comprise determining the frequency error in dependence on slope of straight line.

According to a second embodiment of the invention, there is provided an apparatus for determining a frequency error embodied in a series of values, each comprising a phase component, by a change in those phase components across the series, the device being configured to process each of two or more selected values with another value in the series, each other value being spaced from its respective selected value by a first spacing, to generate processed values that all comprise substantially the same phase component, combine the processed values to generate a combined value that comprises substantially the same phase component as the processed values, repeat the processing and combining with the same selected values but a second spacing, different from the first gap, to generate a combined value comprising a different phase component from the combined value generated using the first spacing, reflecting the frequency error and determine the frequency error in dependence on the combined values generated using the first and second spacings.

The device may be comprised in a receiver configured to operate in a wireless communication network.

BRIEF DESCRIPTION OF THE DRAWINGS

For a better understanding of the present invention, reference is made by way of example to the following figures, in which:

FIG. 1 shows an example of a typical synchronisation preamble and the output from the cross correlation with each section $S_k$ of the synchronisation preamble;

FIG. 2 shows an example of processing blocks involved in a preamble detect scheme;

DETAILED DESCRIPTION OF ILLUSTRATIVE EMBODIMENTS

Figure 3:
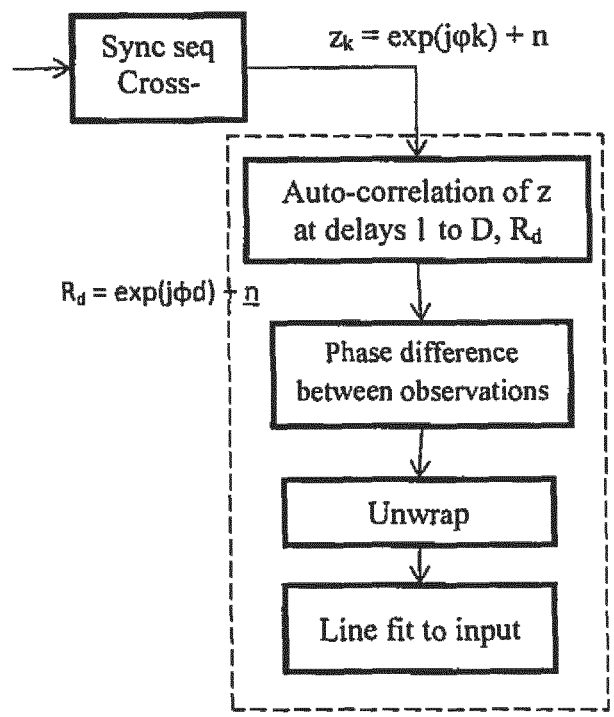
FIG. 3 shows an example of the processing blocks that may be included in an apparatus for determining a frequency error.

The following description is presented to enable any person skilled in the art to make and use the system, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

One embodiment relates to a method for determining a frequency error that is embodied in a series of values. Suitably each value comprises a phase component, and the phase components change across the series as a consequence of the frequency error. The method may provide a means of generating a second series of values, which preserves the phase changes of the original series but which has an improved signal to noise ratio, enabling the frequency error to be detected more accurately and more reliably.

This may be achieved by processing each value with another in the series. Preferably the values that are processed together all have the same position relative to each other in the series. For example, each value may be processed with a value that immediately precedes it in the series, so that the spacing between the two is −1; or each value might be processed with a value that is behind the value that immediately precedes it in the series, so the spacing is −2, and so on. The pairs of values are processed in such a way that all of the processed values resulting from a particular "spacing" have substantially the same phase component. A mechanism for achieving this is described in more detail below.

Suitably this process of processing pairs of values positioned in the same way relative to each other is repeated for at least two different spacings, and possibly more. The outputs of the processing stage for each particular spacing may then be combined. Because the outputs for a particular spacing have uniform phase components, this combination can be performed coherently as far as the wanted part of the outputs are concerned and incoherently as far as the noise components are concerned. The signal to noise ratio is therefore improved over the values in the original series. Also, because the processed outputs generated using different spacings have different uniform phase components, the phase component variation seen in the original series of values can be preserved across the series of combined processing outputs. Thus the frequency error can still be deduced from the combined processing outputs, but that determination is made easier by the improved signal to noise ratio.

In practical communication systems, frequency errors between transmitter and receiver need to be accurately estimated and compensated for in order to prevent phase rotations of the constellation points. One or more embodiments of the invention may be capable of accurately estimating frequency errors in order to accurately demodulate and decode received data. The frequency error or offset may be a difference between transmit and receive carrier frequencies.

The time-varying component of the phase difference could be either positive or negative. Suitably the frequency error between the transmitter and receiver is constant over the time frame of interest so that the time-varying component of the phase difference changes linearly with time.

Suitably the communication system is configured so that the transmitters transmit known training sequences before their data to facilitate estimation of frequency, timing and channel information. The received signal and the known training sequence may be input into a correlator that compares the two. The outputs of the correlator may form a series such as that described above, in which each member of the series comprises a phase component that changes across the series as a consequence of the frequency error between the transmitter and the receiver. Instead of determining the frequency error directly from the correlator output, one or more embodiments of the invention may differ from existing estimation schemes by first comparing correlator outputs to each other to substantially remove the phase change seen across them, and then reintroducing that phase change once the processed values have been coherently combined to improve the SNR.

One or more embodiments of the invention may introduce an autocorrelation stage to combine the correlator outputs. This may have the effect of removing significant amounts of noise at the input to the angle operation, with no reduction to estimation range, allowing near optimum estimation of the frequency offset between transmitter and receiver in very low SNR conditions. This in turn results in more accurate demodulation and decoding of the data. The additional processing required over a traditional frequency offset estimation scheme is small.

Examples of the processing blocks that might be involved in a preamble detection scheme are shown in FIG. 3. One or more of these blocks may be comprised in a receiver or other device, and may implement the following:

A cross-correlation unit where the known preamble sequence is correlated against sections of the received sequence. For example, the preamble may consist of repetitions of a synchronisation word, and the received sequence is correlated against that word.

A selection unit (not shown). The output of the correlation stage is an estimate of the channel impulse response. The maximum tap power of this impulse response may be identified by the selection unit. The maximum tap power is denoted by $z_k = \alpha \exp(j\phi k) + n$ in FIG. 3.

An auto-correlation and summation unit where the vector of tap values found at the maximum power position z is correlated against itself according to the equation:

$$R_d = \frac{1}{N-d} \sum_{k=1}^{N-d} z_k z_{k-d}^* = \exp(j\varphi d) + \underline{n} \quad (1)$$

A line fitting stage, which commences with a phase unit configured to determine the phase difference between outputs of the autocorrelation unit.

An unwrap unit, which continues the line fitting stage by unwrapping the phase differences calculated in the preceding stage.

A line fitting unit in which a line is fitted to the unwrapped phase of the auto-correlation stage by treating the unwrapped phases as noisy estimates of straight line coordinates. The slope of the line may be the phase difference y between samples $T_s$ apart, where $T_s$ is the length of the synchronisation word used in the cross-correlation stage. The frequency error may be determined to be $\phi T_s$.

Figure 4:
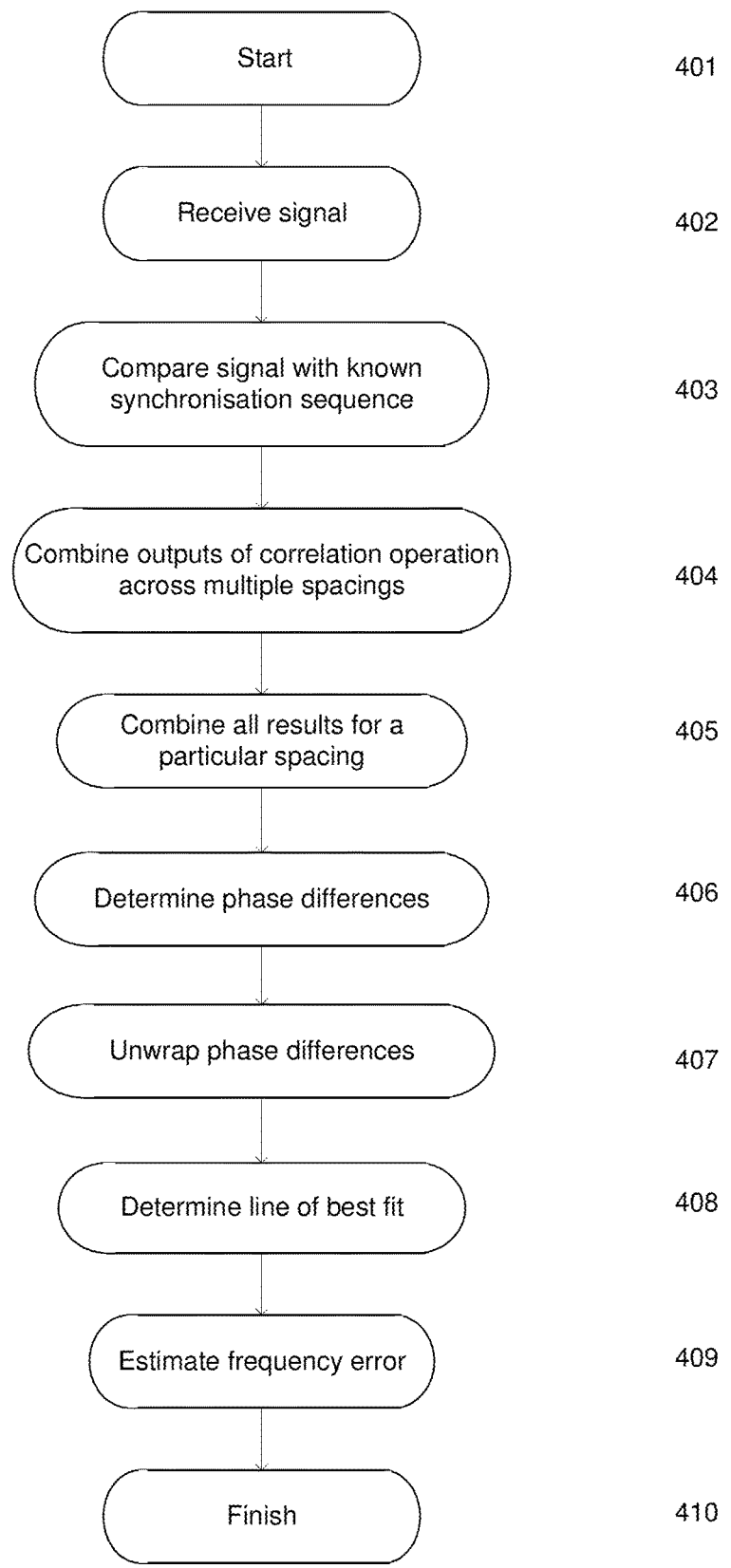
FIG. 4 shows an example of a method for determining a frequency error.

One example of a frequency error estimation process is shown in FIG. 4.

The process starts in step 401. In step 402 a receiver receives a signal from a transmitter. The signal includes a frame, where the term "frame" refers to a communication comprising the preamble sequence followed by a data payload. The preamble is provided to aid the receiver with synchronisation. The preamble suitably includes multiple repetitions of a synchronisation sequence, e.g. N repetitions, where N is greater than 1. The sequence may be of length L chips. An example is illustrated in FIG. 1. The sequence is preferably known to the receiver.

The next step in the process is for the receiver to cross-correlate sections of the received signal with the known synchronisation sequence (step 403). The aim of this stage is to identify the start of the frame in the received signal and to obtain a series of values from which the frequency error can be determined.

Synchronisation Sequence Cross Correlation

Cross-correlation may be achieved by moving the known synchronisation sequence sample-by-sample along the received signal. A correlation output may be generated at each sample offset. The outputs separated by the length of the synchronisation sequence L relate to the same potential lag. The outputs relating to the same lag will, however, each incorporate a different phase component due to the time-varying rotation introduced by the frequency error.

The output of this stage consists of noise when no frame is present, and a noisy estimate of the channel impulse response when a frame is present. The potential lag corresponding to the actual starting point of the frame in the received signal should generate peaks in the output of the correlator. An example is shown in FIG. 1, in which a lag of 5 corresponds to the starting point of the frame.

The correlator outputs corresponding to the starting point of the frame are identified, e.g. by identifying the maximum tap power at the correlator output. The correlator outputs at the correct lag represent an estimate of the channel impulse response that has been modulated by the frequency error between the transmitter and receiver. Therefore, each of the identified outputs incorporates a phase component that is dependent on the frequency error.

Each of the outputs includes a complex number representing the channel gain and a phase component representing the unknown rotation due to the frequency error. This phase component will differ from section to section of the signal due to the time-varying nature of the phase shift. The complex value in respect of the $k^{th}$ synchronisation word is denoted $z_k$ and can be written as:

$$z_k = \alpha \exp(j\phi k) + n \quad (2)$$

where $\phi$ is the phase shift over the length of the synchronisation word caused by the frequency error, $\alpha$ is the channel weight for this tap and n is a noise term. $\alpha$ is set to 1 in the following discussion. However, any value is possible.

An example of an implementation for putting the cross-correlation stage of the process into practice and identifying the lag corresponding to the starting point of the frame is shown in FIG. 2.

Having obtained a series of correlation values for the appropriate lag between the received signal and the known preamble, the process moves to combine those correlation values in such a way as to improve the SNR. In this example, this is achieved by correlating selected values in the series with other values in the series (step 404).

Auto-Correlation

The change in phase component across the correlation series can be substantially removed by combining the correlation outputs generated by two or more different segments of the received signal, leaving processed outputs which all comprise substantially the same phase component. Having the same phase component across the comparisons allows them to be combined coherently, enabling more of the processing gain achievable from the preamble's repetitive structure to be retained.

Figure 5:
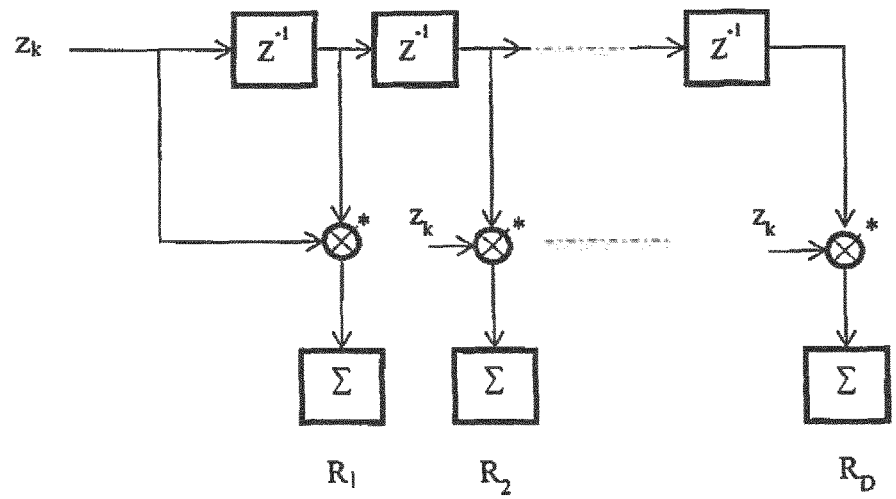
FIG. 5 shows an example of a delay line for autocorrelation processing.

This may be achieved by performing an auto-correlation operation on the vector of z values. The autocorrelation calculation may be calculated according to:

$$R_d = \frac{1}{N-d} \sum_{k=1}^{N-d} z_k z_{k-d}^* = \exp(j\varphi d) + \underline{n} \quad (3)$$

for d=1 to D, for D less than N. The calculation of equation (3) may be achieved by a delay line, such as that illustrated in FIG. 5.

Equation (3) represents a process in which each value in the series is multiplied by the complex conjugate of another value in the series. In each case, the other value is spaced from the original by a spacing or gap (represented by "d" in equation (3)).

To gain insight into this operation, let each value be combined with its neighbour in the series, so that d=1. Let the phase shift due to frequency error between members of the series be represented by θ. Three consecutive members of the series can be written as:

$$z_{k-2} = \exp(j\theta) + n_{k-2}$$

$$z_{k-1} = \exp(j2\theta) + n_{k-1}$$

$$z_k = \exp(j3\theta) + n_k \quad (4)$$

where n is a complex Gaussian noise component.

Figure 7:
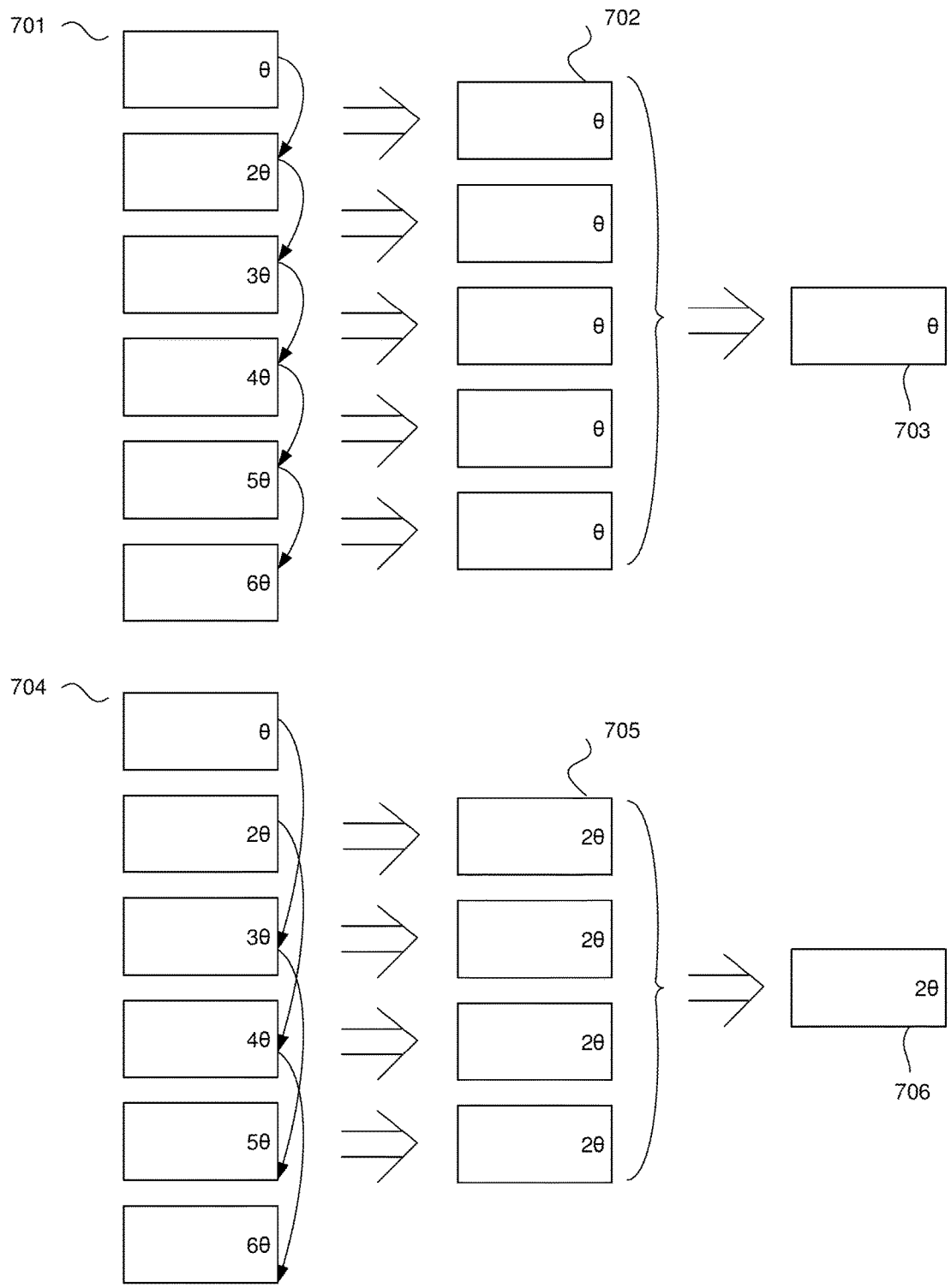
FIG. 7 shows an example of a new series of values embodying a frequency error being formed from an original series.

Similar correlator outputs are shown on the left-hand side of FIG. 7. Each output in the series (701, 704) incorporates a different phase component from the one preceding it, with the phase shift between outputs being represented by θ

The correlator outputs may then be combined across different spacings according to equation (3). For example, correlator output $z_k$ may be multiplied by the conjugate of correlator output $z_{k-1}$:

$$z_k\text{conj}(z_{k-1}) = \exp(j3\theta)\exp(-j2\theta) + \underline{n} = \exp(j\theta) + \underline{n} \quad (5)$$

where $\underline{n}$ is a noise term.

The phase angle θ is dependent on the frequency error only. (If the channel weight α had not been set to 1 the angle of the complex number a would have been cancelled by the conjugation).

Correlator output $z_{k-1}$ may be multiplied by the conjugate of $z_{k-2}$, resulting in the same expression (with a different noise term) as equation (2) above. The same process is repeated across all k outputs. An example of this process being repeated across a six-member series of values is shown in the upper half of FIG. 7.

Comparing equations (4) and (5) above it can be seen that the process has generated a series of corrected correlator outputs that all have the same phase. The unknown phase component introduced by the time-varying rotation has been removed and all the corrected outputs have the same phase component. By rendering the phase of the signal term constant, this stage allows subsequent stages to take advantage of the phase information.

Equations (4) and (5) define the combining of consecutive outputs of the correlator. Preferably this process is repeated across multiple different spacings. For example, output 1 could be combined with output 3 and output 2 with output 4. A similar result is then achieved in terms of equalising the phase component across the outputs with the important distinction that a different uniform phase component is achieved. For example, in FIG. 7 the original series of outputs (701) are combined with a spacing of one to achieve a series of combined correlator outputs having a uniform phase θ (702). This process may then repeated using a spacing of two (704) giving another series of combined correlator outputs, but this time with a uniform phase 2θ (706).

An advantage of equalising the phase is that it allows the resulting combined correlator outputs to be combined coherently (step 405), which is described in more detail below.

Coherent Combining

The correlator outputs are preferably combined using differential coherent combining so that the noise values combine incoherently. An example is given in equation (5). The autocorrelation outputs generated using a particular spacing are then preferably combined coherently by taking the phase information across those outputs into account. An example is given in equation (3). This combination of coherent and incoherent combining may improve the SNR. Overall, for the $d^{th}$ value, N–d $z_k$ values can be viewed as having been combined using differential coherent combining. The signal to noise power ratio (SNR) is significantly higher for the new series (of length D) sequence than the SNR for original series (of length N). The combined autocorrelation outputs do, however, have the same phase rotation between values as the outputs of the cross-correlation stage. They can therefore be used to determine the frequency error.

This is illustrated in FIG. 7 by the original series on the left-hand side (701, 704) and the newly generated series on the right-hand side (703, 706). The newly generated series shows the same phase shift as the original series but with improved SNR as a consequence of the coherent combining of autocorrelation outputs 702, 705.

The next stage of the process involves determining the frequency error using the newly generated series of values. The first step is to determine the phase difference between members of the newly generated series (step 406).

Phase Difference

This stage calculates the phase difference between $R_d$ and $R_{d-1}$. This phase difference can be calculated according to the expression $$\phi_d = \text{angle}(R_d R_{d-1}^*) \quad (6)$$

Figure 6:
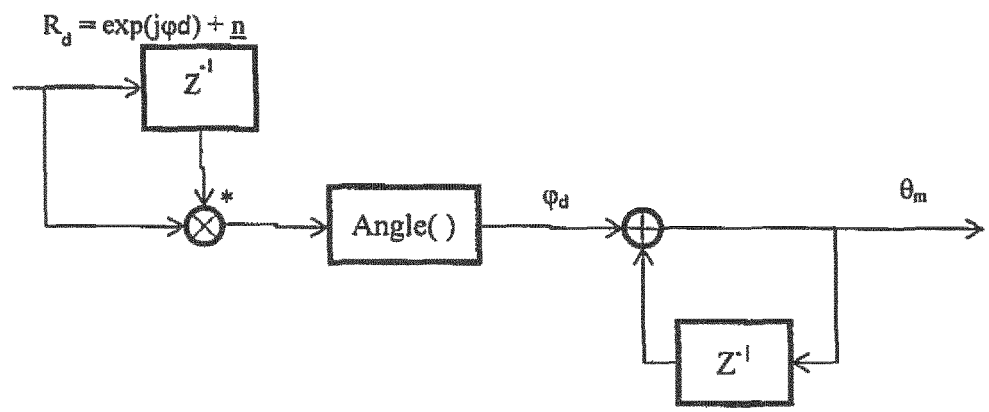
FIG. 6 shows an example of an arrangement for phase difference and phase unwrap processing.

An example of an implementation for putting equation (6) into practice is shown in FIG. 6.

Phase Unwrap

This stage unwraps the phase values $\phi_d$ into a line (step 407). Again the example implementation shown in FIG. 6 is capable of implementing this unwrapping. In the example of FIG. 6, the unwrapped phase is calculated according to:

$$\theta_m = \sum_{d=1}^{m} \phi_d \quad (7)$$

Line Fit

Figure 8:
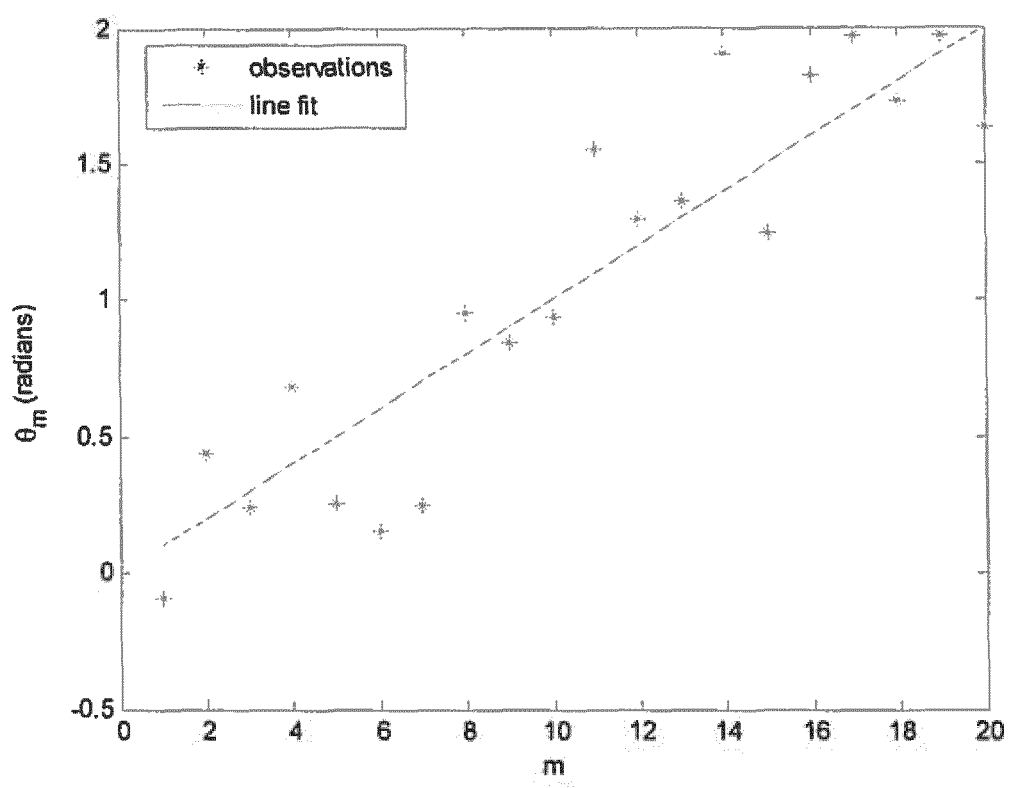
FIG. 8 shows an example of a line fitting to noisy data.

The unwrapped phase values can be considered as representing noisy estimates of straight line coordinates. The final stage may therefore involve fitting a line to the unwrapped phase (step 408). An example of a line of best fit is illustrated in FIG. 8. The slope of the line provides an estimate of the frequency error.

The frequency error is estimated in step 409. The process terminates in step 410.

Steps 406 to 409 together provide one example of a method for estimating the frequency error given the phase changes embodied by the newly generated series of values. However, this is for the purposes of example only and in practice any suitable frequency offset estimation method can be used.

The exact processes described above are given for the purposes of example only and it should be understood that to the extent that other processes could achieve the same or similar results in terms of unifying the phase components across the series of values and generating a new series reflecting the original phase changes, the processes and apparatus described above could be modified to include one or more of those other processes in place of the processes described above.

The apparatus shown in FIGS. 2 and 3 are shown illustratively as comprising a number of interconnected functional blocks. This is for illustrative purposes and is not intended to define a strict division between different parts of hardware on a chip. In practice, the apparatus preferably uses a microprocessor acting under software control for implementing the methods described herein. In some embodiments, the algorithms may be performed wholly or partly in hardware. In particular, the implementation examples shown in FIGS. 5 and 6 may be put into practice using delay lines that are at least partly implemented in hardware.

Figure 9:
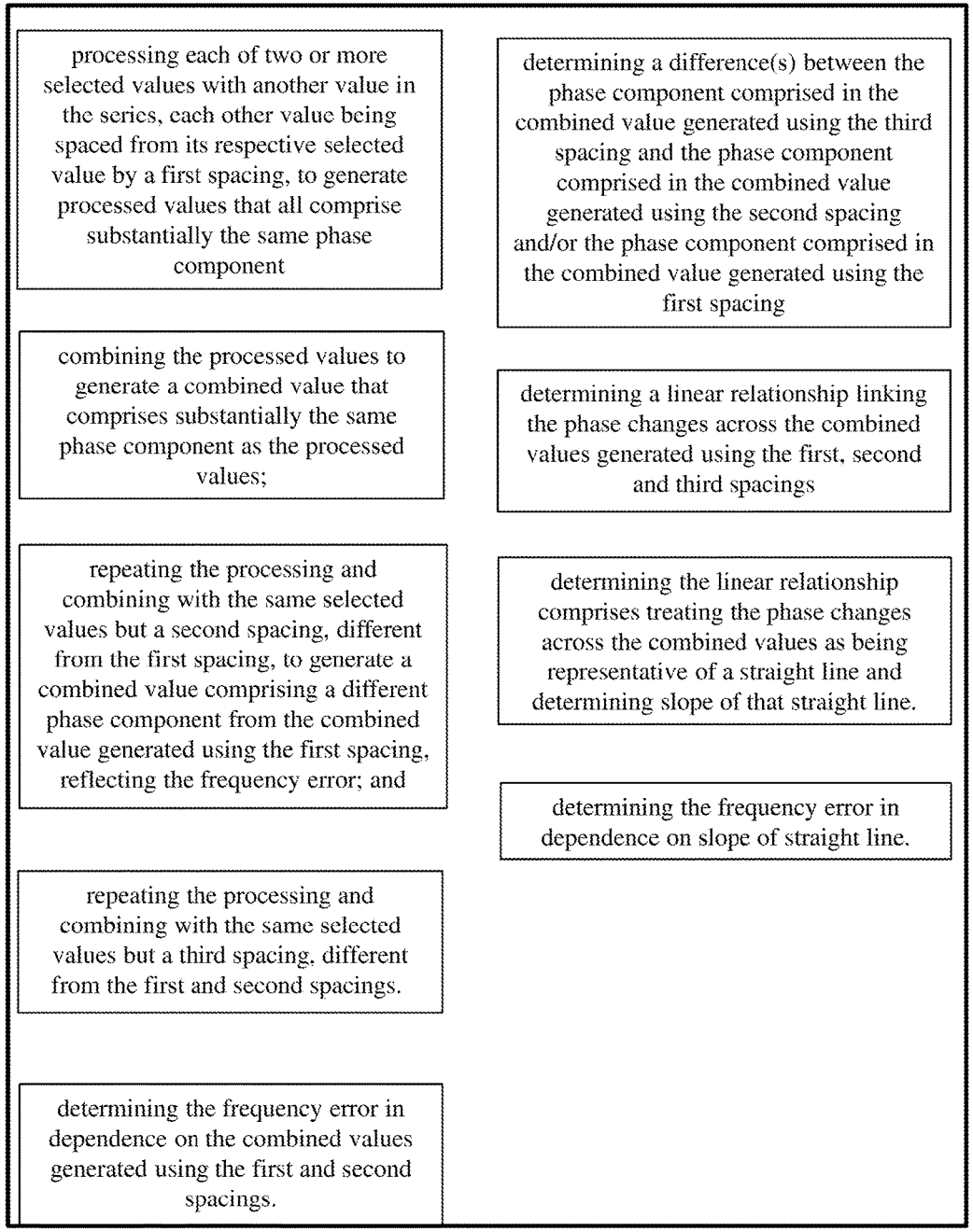
FIG. 9 is a method for determining a frequency error embodied in a series of values.

FIG. 9 is a method for determining a frequency error embodied in a series of values, each comprising a phase component, by a change in those phase components across the series. The steps of the method are shown in FIG. 9.

An apparatus configured to implement some or all of the processes described herein may be wholly or partly comprised within a receiver. Alternatively, the apparatus may be implemented in a separate piece of equipment from a receiver and the receiver may pass the received signal, or a processed version of it, to the apparatus for processing.

The embodiments described herein might be advantageously implemented in any wireless communication network. The method might, for example, be advantageously implemented in a communication network that implements a communication protocol such as the Weightless protocol for machine communications. In Weightless, communication between a base station and its associated terminals is achieved by means of a series of frames, each comprising a preamble, a downlink data portion and an uplink data portion. The embodiments described herein might be implemented in terminals, base stations and/or any other network equipment. Weightless is also designed to operate in unlicensed parts of the frequency spectrum, which are particularly susceptible to low SNR conditions. Weightless is mentioned for the purposes of example only. It should be understood that the methods described herein might be implemented in accordance with any communication protocol in which communications incorporate synchronisation sequences as an aid to receiving devices and/or which is designed to operate in unlicensed parts of the frequency spectrum.

The applicants hereby disclose in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems discloses herein, and without limitation to the scope of the claims. The applicants indicate that aspects of the present invention may consist of any such feature or combination of features. In view of the foregoing description it will be evident to a person skilled in the art that various modifications may be made within the scope of the invention.

The invention claimed is:

1. A method for wireless communication, the method comprising:
   at a receiver, receiving a series of values, each output in the series comprising a different phase component from the one preceding it because of an unknown phase component introduced by a time-varying, rotation element due to a frequency error between a transmitter and the receiver;
   processing each of two or more selected values with another value in the series, each other value being spaced from its respective selected value by a first spacing, to generate a series of processed values that all comprise the same phase component;
   combining the series of processed values using differential coherent combining to generate a series of combined values that comprises the same phase component as the series of processed values;
   repeating the processing and combining with the same selected values but a second spacing, different from the first spacing, to generate a series of combined values comprising a different phase component from the series of combined values generated using the first spacing, reflecting the frequency error; and
   determining the frequency error in dependence on the series of combined values generated using the first and second spacings.

2. The method as claimed in claim 1, in which each value in the series of values represents a comparison between a received signal and a known sequence.

3. The method as claimed in claim 2, comprising comparing the received signal with the known sequence by: selecting a section of the received signal; performing a correlation operation between the selected section and the known sequence; and designating the result of that correlation as a value in the series.

4. The method as claimed in claim 2, in which the change in the phase components across the series of values reflects the received signal becoming increasingly rotated with respect to the known sequence as a consequence of said frequency error.

5. The method as claimed in claim 1, in which the phase components change across the series of values linearly with time.

6. The method as claimed in claim 1, comprising processing each of the selected values with their respective other value by performing a correlation operation between the two values.

7. The method as claimed in claim 1, in which each of the series of values comprises a wanted component and noise, the method comprising processing the series of values and combining the processed values such that the wanted components are coherently combined and the noise is incoherently combined, wherein the combined values so generated form a second series of values that embodies the frequency error but in which the ratio of wanted component to noise has been improved compared with the series of values.

8. The method as claimed in claim 1, in which determining the frequency error comprises determining a difference between the phase component comprised in the combined value generated using the first spacing and the phase component comprised in the combined value generated using the second spacing.

9. The method as claimed in claim 8, in which determining the difference in phase component comprises multiplying one of the combined values generated using the first and second spacings with the complex conjugate of the other of the combined values generated using the first and second spacings.

10. The method as claimed in claim 1, comprising repeating the processing and combining with the same selected values but a third spacing, different from the first and second spacings.

11. The method as claimed in claim 10, comprising determining a difference(s) between the phase component comprised in the combined value generated using the third spacing and the phase component comprised in the combined value generated using the second spacing and/or the phase component comprised in the combined value generated using the first spacing.

12. The method as claimed in claim 11, comprising determining linear relationship linking the phase changes across the combined values generated using the first, second and third spacings.

13. The method as claimed in claim 12, in which determining the linear relationship comprises treating the phase changes across the combined values as being representative of a straight line and determining slope of that straight line.

14. The method as claimed in claim 13, comprising determining the frequency error in dependence on slope of straight line.

15. An apparatus for wireless communication, the apparatus comprising:
   at a receiver, receiving a series of values, each output in the series comprising a different phase component from the one preceding it because of an unknown phase component introduced by a time-varying rotation element due to a frequency error between a transmitter and the receiver;
   a memory storing a program;
   a processor for executing the program, the program comprising instructions for:
   processing each of two or more selected values with another value in the series, each other value being spaced from its respective selected value by a first spacing, to generate a series of processed values that all comprise the same phase component;
   combining the series of processed values using differential coherent combining to generate a series of combined values that comprises the same phase component as the series of processed values;
   repeating the processing and combining with the same selected values but a second spacing, different from the first spacing, to generate a series of combined values comprising a different phase component from the a series of combined values generated using the first spacing, reflecting the frequency error; and
   determining the frequency error in dependence on the series of combined values generated using the first and second spacings.

* * * * *

UNITED STATES PATENT AND TRADEMARK OFFICE
CERTIFICATE OF CORRECTION

PATENT NO.        : 9,516,616 B2
APPLICATION NO.   : 14/400404
DATED             : December 6, 2016
INVENTOR(S)       : Robert Young It is certified that error appears in the above-identified patent and that said Letters Patent is hereby corrected as shown below:

In Column 10, Line 19, Claim 1, delete "time-varying, rotation" and insert --time-varying rotation--.

In Column 11, Line 27, Claim 12, delete "determining linear" and insert --determining a linear--.

Signed and Sealed this
Eighteenth Day of April, 2017

Michelle K. Lee
*Director of the United States Patent and Trademark Office*